(12) United States Patent
Kumble et al.

(10) Patent No.: US 6,635,757 B1
(45) Date of Patent: Oct. 21, 2003

(54) PROCESS FOR PREPARING CYCLODEXTRIN INCLUSION COMPLEX

(75) Inventors: Sandeep Prabhu Kumble, Mysore (IN); Ramaswamy SambasivamAnnadurai, Bangalore (IN); Malladi Srinivas, Bangalore (IN); Alapati Srinivasa Rao, Bangalore (IN); Candadai Seshardi Ramadoss, Bangalore (IN); Pillarisetti Venkata Subba Rao, Bangalore (IN)

(73) Assignee: Vittal Mallya Scientific Research Foundation, Bangalore (IN)

( * ) Notice: Subject to any disclaimer, the term of this patent is extended or adjusted under 35 U.S.C. 154(b) by 0 days.

(21) Appl. No.: 09/936,705

(22) Filed: Sep. 14, 2001

(51) Int. Cl.$^7$ ............... C07Q 17/00; C07H 1/00; C07H 3/00; C08B 37/00
(52) U.S. Cl. ............... 536/124; 514/54; 514/58; 536/102; 536/103; 536/123.1; 536/127; 536/128
(58) Field of Search .......... 514/54, 58; 536/102, 536/103, 123.1, 124, 127, 128

(56) References Cited

U.S. PATENT DOCUMENTS

| 4,511,564 | A | * | 4/1985 | Ishizuka et al. | ............ | 514/167 |
|---|---|---|---|---|---|---|
| 5,223,295 | A | * | 6/1993 | Maffrand et al. | ............ | 426/431 |
| 5,292,533 | A | * | 3/1994 | McMahon et al. | .......... | 424/408 |
| 5,635,238 | A | * | 6/1997 | Trinh et al. | ................. | 426/650 |
| 5,650,160 | A | * | 7/1997 | Mazomenos et al. | ....... | 424/405 |
| 5,679,662 | A | * | 10/1997 | Chang et al. | ................. | 514/66 |
| 5,994,266 | A | * | 11/1999 | Hobbs et al. | ................ | 504/116 |
| 6,001,821 | A | * | 12/1999 | Pitha | ........................... | 514/58 |

* cited by examiner

Primary Examiner—James O. Wilson
Assistant Examiner—Patrick Lewis
(74) Attorney, Agent, or Firm—Sidley Austin Brown & Wood LLP

(57) ABSTRACT

The present invention relates to a process for the preparation of a water soluble inclusion complex of neem seed kernel extract (NSKE) containing azadirachtin-A in cyclodextrin and its use in an insecticidal formulation. The process of the present invention comprises the following steps adding neem seed kernel extract containing azadirachtin-A to cyclodextrin, the molar ratio of azadirachtin-A to the cyclodextrin ranging from 1:0.5 to 1:20, stirring the above mixture, filtering the above mixture to obtain a water soluble inclusion complex of neem seed kernel extract, if desired, freeze/spray drying the said water soluble complex of neem seed kernel extract to get a free flowing pale cream powder.

10 Claims, 1 Drawing Sheet

Figure 1: Effect of NSKE and water soluble cyclodextrin inclusion complex of NSKE/Formulation on *Spodoptera litura* larvae (for details see Table 2)
Aza: Azadirachtin-A; NSKE: Neem seed kernel extract; βMCD: β-Methyl cyclodextrin

US 6,635,757 B1

PROCESS FOR PREPARING CYCLODEXTRIN INCLUSION COMPLEX

This application is a 371 of PCT/IN99/00009 filed Mar. 18, 1999.

This invention relates to a process for the preparation of water soluble cyclodextrin) inclusion complex of neem seed kernel extract containing azadirachtin-A and its use in insecticidal formulation.

BACKGROUND OF THE INVENTION

Azadirachtin, a tetranortriterpenoid isolated from the seed kernels of the Indian neem tree *Azadirachta indica* is known to be active on more than 200 economically important species of insects. It often causes moult inhibition, growth retardation, antifeedancy, sterilisation of the ovaries and reduced fecundity in adults. It is active at ppm levels and the physiological concentration required to elicit growth retardation varies from species to species, between 1–100 ppm. Azadirachtin containing insecticides first act as oral poisons. Death of the target insect is dose dependent, usually occurring a few days after application but in extreme cases the larvae may live upto several weeks without undergoing metamorphosis. Azadirachtin-A can be is obtained in 99% purity by repeated chromatography but it is not as active as NSKE (containing azadirachtin-A<70%).

Neem seed kernel extract containing azadirachtin-A is very sparingly soluble in water and several surfactants are used to enhance its solubility in insecticidal formulations. Achieving complete solubility in water without altering the insecticidal activity has not been attempted so far. Considering this point, we have developed a process for preparing a water soluble NSKE containing azadirachtin-A fulfilling the requirements of a true eco-friendly, biopesticide.

Cyclodextrins are cyclic oligosacclarides consisting or glucose units fused together as a ring. This arrangement of the glucose units makes the molecule appear like a truncated cone. The primary and secondary hydroxyl groups of the glucose units arc present on the exterior of the cyclodextrin molecule thus making the exterior part hydrophilic, whereas the interior of the cyclodextrin molecule is hydrophobic This amphiphatic property of cyclodextrin makes it an ideal molecule for solubilising water insoluble compounds by forming inclusion complexes. α, β and γ-cyclodextrins are the three naturally occurring forms consisting of 6, 7 and 8 glucose units respectively. Among these, β-cyclodextrin is the most abundant and commonly used one. Several synthetic derivatives of cyclodextrins such as methyl, propyl, isopropyl, hydroxy methyl, hydroxy ethyl, hydroxy propyl and sulfo alky, have also been used to enhance their solubility in water.

Natural cyclodextrins and their derivatives are being used in the pharmaceutical industry for solubilising sparingly water soluble drugs to enhance their bioavailability. Some of the drugs like Piroxicam, Lonmiel, Nitropen, Pansporin-T etc., are commercially available in the cyclodextrin encapsulated form also.

Biopesticides of plant origin have several advantages over their synthetic counterparts. Azadirachtin-A is the best-characterized candidate both biologically and chemically among known plant derived insecticides. The exact mode of action of this compound in insects is still not fully understood, even though it is implicated as an antihormonal substance that blocks the release of the neurohemal substances from the carpus cardiacum into the hemolymph.

Although azadirachtin has very potent insecticidal activity, it is highly unstable in aqueous medium and extremely sensitive to sunlight. A number of insecticidal formulations containing azadirachtin such as Neem gold, Fortune Aza, Margosan O, Neemazal F, etc. are available in the market. All these commercial formulations contain several surfactants and a solvent like ethanol, methanol, turpentine, isopropanol, polyethylene glycol. etc. as a carrier. The use of these carriers and surfactants in biopesticidal formulations containing azadirachtin has not sufficiently enhanced the shelf life of the formulations.

Patent Number WO-A1-921609 discloses a method for the preparation of a storable azadirachtin-rich insecticide extracting crushed neem seed kernel with water, extracting the aqueous phase with an organic solvent, concentrating azadirachtin contained solvent to produce a concentrate. Patent number EP-A1-0581469 disclosed the method for preparing high purity neem seed kernel extract by loading aqueous neem seed extract macroporous polymeric adsorbent followed by desorption using solvent such as alcohol, an ester or ethyl acetate, methanol or methyl isobutylketone. Patent no. EP-A1-0581467 relates to a process for preparing storage stable neem seed extract by dissolution of crude neem seed extract in a polar solvent and removal of impurities by precipitation and/or treatment of the extract with an oxidizing agent.

For these reasons, the object of this invention was to develop a stable neem seed kernel extract preparation containing azadirachtin-A that is completely water soluble, possessing the following characteristics:

The substance used for solubalisation should be economical, safe, biodegradable and freely soluble in water.

Should not reduce the insecticidal activity of the parent molecules upon solubilisation.

Should contain in addition to azadirachtin-A, other limonoids which are also known to enhance the insecticidal activity either directly or through synergism.

Should not have any phytotoxiety.

Further object of the invention is to make an insecticidal formulation, which is ecofriendly and devoid of presence of any organic solvents or surfactants.

To achieve the first objective, this invention provides a process for the preparation of a water soluble inclusion complex of the neem seed kernel extract (NSKE) containing azadirachtin-A in cyclodextrin comprising:

adding neem seed kernel extract containing 0.01% to 96% of azadirachtin-A by wt. to cyclodextrin, the molar ratio of azadirachtin-A to the cyclodextrin ranging from 1:0.5 to 1:20, stirring the above mixture, filtering the above mixture to obtain a water soluble inclusion complex of neem seed kernel extract, and if desired, freeze/spray drying the said water soluble complex of neem seed kernel extract to get a free flowing pale cream powder.

Cyclodextrin, may be natural cyclodextrins or their synthetic derivatives or row combination thereof. The said natural cyclodextrins are α, β, γ cyclodextrins and the synthetic derivatives are methyl, propyl, isopropyl, hydroxymethyl, hydroxyethyl, hydroxypropyl and sulpho alkyl derivatives. The said synthetic derivative is a β-methylcyclodextrin [(2,6-di-O-methyl)-β-cyclodextrin].

Initial experiments on the solubilisation of azadirachtin-A (96% pure) in β-methyl cyclodextrin indicated that a 1:1 water soluble complex is formed. However, when NSKE containing azadirachtin-A in the range of 10 to 40% (w/w)

was extracted with 1 molar equivalent of β-methyl cyclodextrin corresponding to the azadirachtin-A content, it as observed that there was no selective extraction of azadirachtin-A. In fact, other limonoids present in NSKE were also encapsulated. Therefore, larger amount of cyclodextrin had to be used to maximize extraction and it was found that a 1:4 molar ratio of azadirachtin-A to β-methyl cyclodextrin appeared to be optimum, when extractability and economy was considered. When β-cyclodextrin was used instead of β-methyl cyclodextrin for solubilising NSKE, it was observed that some of the cyclodextrin also remain in the residue due to relatively poor solubility of β-cyclodextrin in water. Such a cyclodextrin inclusion complex of neem seed kernel extract containing azadirachtin-A and other limonoids obtained by the process mentioned in this invention was found to be highly water-soluble.

To achieve the second objective, this invention provides an insecticidal formulation comprising:

a solution of inclusion complex containing cyclodextrin and neem seed kernel extract containing azadirachtin-A in water in the ratio of 0.1 to 1000 ppm with respect to azadirachtin-A, and if desired, 0.001% to 25% of sun screen agents or salicylic acid or its derivatives either alone or in combination based on azadirachtin-A content in the inclusion complex ranging from 1% to 50% (wt/wt) for enhancing the shelf life and in plant defense mechanism against pathogen to have multiple effect.

The sunscreen agents are hydroquinone and anacardic acid.

The salicylic acid, hydroquinone, anacardic acid are complexed in cyclodextrin with the ratio of salicylic acid/hydroquinone to cyclodextrin ranging from 1:0.5 to 1:20.

Inclusion complex of neem seed kernel extract (NSKE) contains azadirachtin-A of 0.01% to 96% purity.

TABLE 1

Comparison of the effect of NSKE, βMCD inclusion complex of NSKE and formulation on the post-embryonic development of *Spodoptera litura* larvae

| Test Compound* | Conc. of azadirachtin-A (ppm) | Duration for moulting (Days) | | | Average wt. of larvae (gms) | | | Duration to Pupate (Days) | Pupal wt. (gms) | Duration of Pupal Stage (Days) | Pupal mortality % |
|---|---|---|---|---|---|---|---|---|---|---|---|
| | | I–II | II–III | III–IV | II | III | IV | | | | |
| NSKE (32% Aza A) — βMCD complex | 25 | 2 | 4 | T | 0.032 | 0.066 | T | T | T | T | T |
| NSKE (96% Aza A) — βMCD complex | 25 | 2 | 2 | 2 | 0.095 | 0.056 | 0.194 | 14 | 0.335 | 12 | 66 |
| NSKE (32% Aza A) | 25 | 2 | 3 | T | 0.036 | 0.058 | T | T | T | T | T |
| NSKE (96% Aza A) | 25 | 2 | 3 | 2 | 0.038 | 0.166 | 0.297 | T | T | T | T |
| Formulation | 25 | 2 | 2 | 4 | 0.033 | 0.086 | 0.285 | T | T | T | T |
| Control (Blank)# | 0 | 1 | 2 | 2 | 0.015 | 0.144 | 0.243 | 11 | 0.306 | 10 | Nil |
| Control (βMCD) | 0 | 2 | 2 | 2 | 0.088 | 0.198 | 0.386 | 11 | 0.372 | 12 | Nil |

Aza A: azadirachtin-A; βMCD: β-methl cyclodextrin; NSKE: neem seed kernal extract; T — termination of larval development;
*The percentages indicated in the parentheses correspond to the azadirachtin-A concentration in the NSKE.
The developmental profiles of water control and ethanol control follow the same trend (see FIG. 1).
Formulation (see text)

TABLE 2

Comparison of the effect of NSKE, βMCD inclusion complex of NSKE and formulation on the post-embryonic development of *Spodoptera litura* larvae

| Test Compound* | Conc. of azadirachtin-A (ppm) | Duration for moulting (Days) | | | Average wt. of larvae (gms) | | | Duration to Pupate (Days) | Pupal wt. (gms) | Duration of Pupal Stage (Days) | Pupal mortality % |
|---|---|---|---|---|---|---|---|---|---|---|---|
| | | I–II | II–III | III–IV | II | III | IV | | | | |
| NSKE (32% Aza A) — βMCD complex | 100 | 1 | 2 | T | 0.019 | 0.039 | T | T | T | T | T |
| NSKE (96% Aza A) — βMCD complex | 100 | 1 | 2 | 3 | 0.018 | 0.059 | 0.196 | 14 | 0.242 | 10 | 66 |
| NSKE (32% Aza A) | 100 | 1 | 3 | T | 0.023 | 0.058 | T | T | T | T | T |
| NSKE (96% Aza A) | 100 | 1 | 3 | 2 | 0.007 | 0.033 | 0.041 | T | T | T | T |
| Formulation | 100 | 1 | 2 | 4 | 0.034 | 0.073 | 0.214 | T | T | T | T |
| Control (Blank)# | 0 | 1 | 2 | 2 | 0.030 | 0.193 | 0.327 | 11 | 0.306 | 9 | Nil |
| Control (βMCD) | 0 | 1 | 2 | 3 | 0.015 | 0.068 | 0.427 | 12 | 0.372 | 12 | Nil |

Aza A: azadirachtin-A; βMCD: β-methl cyclodextrin; NSKE: neem seed kernal extract; T — termination of larval development;
*The percentages indicated in the parentheses correspond to the azadirachtin-A concentration in the NSKE.
The developmental profiles of water control and ethanol control follow the same trend (see FIG. 1).
Formulation (see text)

The bioactivity studies of the complexes and formulations done on *Spodoptera litura* and *Helicoverpa armigera* larvae showed that the inclusion complex was active at concentrations ranging from 1–100 ppm in leaf disc assays. The first instar larvae treated with solublised neem seed extract containing 25 ppm of azadirachtin-A have prolonged postembryonic development in comparison to other treatments (Table 1). The larvae of the solublised NSKE treated group never survived beyond the third instar and their growth indices were comparatively lower than all other treatments. In the case where cyclodextrin alone was used as control, the normal development took place with out any pupal mortality, eventhough there was some delay in pupal emergence. All pupae emerged to normal adults which reproduced normally, indicating that cyclodextrin as such does not contribute for the observed effects of the complex. At a dosage of 100 ppm, the developmental profile of the larvae was similar to that of 25 ppm but the growth indices were considerably lower than the latter (Table 2). Total mortality of the solublised complex treated group was achievable within 3 days. Hence, the bioactivity studies clearly indicate that there is no reduction in the insecticidal activist of the complexed product both at lethal (25–100 ppm) and sublethal (1–10 ppm) doses as compared to that of the uncomplexed NSKE (Figure, of the accompanying drawing). Further, no phytotoxiety was observed under laboratory conditions, when leaf surfaces were sprayed with the water soluble NSKE complex containing azadirachtin-A (1–100 ppm).

The invention will now be described with reference to the following examples:

Preparation of Inclusion Complex of NSKE

EXAMPLE 1

Preparation of 1:1 molar ratio inclusion complex of NSKE [containing 96% azadirachtin-A (w/w)] in β-methyl cyclodextrin: To a solution of β-methyl cyclodextrin (5 g) in 15 mL of water, 2.85 g of NSKE (containing 96% azadirachtin-A) was added. The contents were shaken and freeze/spray dried to give 7.7 g of the water-soluble complex. Azadirachtin-A content in the complex was found to be 37% (w/w). However, there was no change in the concentration of azadirachtin when the weight of cyclodextrin in the complex was excluded.

EXAMPLE 2

Preparation of inclusion complex of NSKE [containing 14% azadirachtin-A (w/w)] in β-methyl cyclodextrin: To a solution of β-methyl cyclodextrin (5.0 g) in 15 mL of water, 5 g of NSKE (containing 14% azadirachtin-A) was added. The contents were stirred at 37° C. for 6 hours and then filtered through a Whatmann No. 1 filter paper. The residue was washed with water (5 mL×2) and filtered and the combined filtrate was freeze/spray dried to give 7.05 g of the water soluble complex Azadirachtin-A content in the complex was found to be 5.5 (w/w). The azadirachtin-A content without cyclodextrin was around 14% indicating that there was no change in the concentration of the active principle by cyclodextrin complexation suggesting that all the constituents of NSKE are proportionately encapsulated in cyclodextrin. There was also no loss of azadirachtin-A during the extraction process.

EXAMPLE 3

Preparation of inclusion complex of NSKE [containing 32% azadirachtin-A (w/w)] in β-methyl cyclodextrin: To a solution of β-methyl cyclodextrin (5 g) in 15 mL of water, 2.15 g of NSKE (containing 32% azadirachtin-A) was added. The contents were stirred at 37° C. for 6 hours and then filtered through a Whatmann No 1 filter paper. The residue was washed with water (5 mL×2) and filtered and the combined filtrate was freeze/spray dried to give 6.35 g of the water soluble complex. Azadirachtin-A content in the complex was found to be 6.8% (w/w). The unsolubilised residue obtained was 0.78 g and the azadirachtin-A content in the residue was found to be 31.4%. This confirms that the left over material had the same composition as the starting material and hence could be completely solubilised by using another volume of aqueous solution of β-methyl cyclodextrin.

EXAMPLE 4

Preparation of inclusion complex of NSKE, [containing 40% azadirachtin-A (w/w)] in β-methyl cyclodextrin: To a solution of β-methyl cyclodextrin (5 g) in 15 mL of water 1.72 g of NSKE (containing 40% azadirachtin-A) was added. The contents were stirred at 37° C. for 6 hours and then filtered through a Whatmann No. 1 filter paper. The residue was washed with water (5 mL×2) and filtered and the combined filtrate was freeze/spray dried to give 5.44 g of the water soluble complex. Azadirachtin-A content in the complex was found to be 8–5% (w/w). The unsolubilised residue obtained was 0.89 g. Here again the residue could be completely solubilised by using another volume of aqueous solution of β-methyl cyclodextrin.

EXAMPLE 5

Preparation of inclusion complex of NSKE (containing 32% azadirachtin-A w/w) using a mixture of β-methyl cyclodextrin and β-cyclodextrin: To a solution of β-methyl cyclodextrin (1.74 g) and β-cyclodextrin (0.5g) in 10 mL of water was added with stirring 1.0 g of NSKE (containing 32% azadirachtin-A). The contents were stirred at 37° C. for 6 hours and then filtered through a Whatmann No, 1 filter paper. The residue was washed with water (5 mL×2), filtered and the combined filtrate was freeze/spray dried to give 2.55 g of the water soluble complex containing azadirachtin-A [6.11% (w/w)]. The unsolubilised residue obtained was 0.57 g and the azadirachtin-A content in the residue was found to be 23.7% (w/w).

Insecticidal Formulation Using Water Soluble Cyclodextrin Inclusion Complex of Neem Seed Kernel Extract (NSKE) Containing Azadirachtin-A

EXAMPLE 1

Insecticidal liquid spray composition using water soluble NSKE inclusion complex: To 1000 mL of water, 14.7 g of water soluble NSKE inclusion complex containing 6.8% azadirachtin-A (w/w) was added and stirred to get a clear solution containing 1000 ppm of azadirachtin-A (w/w). This stock solution was used for bio-assays at concentration ranging from 1 to 100 ppm by direct dilution with water.

EXAMPLE 2

Insecticidal composition using water soluble NSKE inclusion complex: To 100 g of water soluble NSKE inclusion complex containing 6.8% azadirachtin-A (w/w) was added 500 mL aqueous solution containing salicylic acid (0.68 g) and hydroquinone(0.68 g) [each $\frac{1}{10}^{th}$ (w/w) basis of azadirachtin-A ], and stirred for 30 min at 37° C. The ingredients were filtered and freeze/spray dried to obtain a powder containing 6.7% of azadirachtin-A and 0.67% (w/w) of each of the additives viz. Salicylic acid and hydroquinone.

EXAMPLE 3

Preparation of 1:1 molar ratio inclusion complex of salicylic acid in β-methyl cyclodextrin: To a solution of β-methyl cyclodextrin (47.74 g) in 150 mL of water. 5 g of salicylic acid was added. The contents were shaken and freeze/spray dried to give 52.74 g of the complex. Salicylic acid content in the complex was round to be 9.5% (w/w).

EXAMPLE 4

Preparation of 1:1 molar ratio inclusion complex of hydroquinone in β-methyl cyclodextrin: To a solution of β-methyl cyclodextrin (59.18 g) in 150 mL of water, 5 g of hydroquinone was added. The contents were shaken and freeze/spray dried to give 64.18 g of the complex. Hydroquinone content in the complex was found to be 7.8% (w/w).

EXAMPLE 5

Insecticidal composition using the water soluble NSKE inclusion complex and β-methyl cyclodextrin solubilised additives [each $1/10^{th}$ (w/w) basis of azadirachtin-A]: β-methyl cyclodextrin-salicylic acid complex (7.2 g, containing 0.68 g of salicylic acid, from Example 3) and β-methyl cyclodextrin-hydroquinone complex (8.8 g, containing 0.68 g of hydroquinone, from Example 4) were added to 100 g of water soluble NSKE inclusion complex containing 6.8% azadirachtin-A (w/w) and blended thoroughly. The powder thus obtained contains 6.66% (w/w) of azadirachtin-A and 0.66% (w/w) of each of the additives viz. Salicylic acid and hydroquinone.

EXAMPLE 6

Insecticidal composition using the water soluble NSKE inclusion complex and β-methyl cyclodextrin solubilised additives [each $1/10^{th}$ (w/w) basis of azadirachtin-A]: Salicylic acid (0.68 g) and hydroquinone (0.68 g) were added to a 25 ml solution of β-methyl cyclodextrin (14.67 g) and stirred for 30 min. to the resultant clear solution was added 100 g of water soluble NSKE inclusion complex containing 6.8% azadirachtin-A (Avon) dissolved in 500 mL of water and stirred for 30 min at 37° C. The solution obtained was filtered and freeze/spray dried to obtain a powder containing 6.66% (w/w) of azadirachtin-A and 0.66% (w/w) of each of the additives viz. Salicylic acid and hydroquinone.

EXAMPLE 7

Insecticidal composition using the water soluble NSKE inclusion complex and β-methyl cyclodextrin solubilised additives [each $1/10^{th}$ (w/w) basis of azadirachtin-A]: This formulation was made in the same lines as that given in Example 6, except that anacardic acid was used instead of hydroquinone as the sunscreen agent.

We claim:

1. Insecticidal formulation including inclusion complex of neem seed kernel extract (NSKE) containing azadirachtin-A comprising:

a solution of inclusion complex containing cyclodextrin and neem seed kernel extract containing predominantly azadirachtin-A in water in the range of 0.1 to 1000 ppm with respect to azadirachtin-A, and if desired, 0.001%–25% of sun screen agents or salicylic acid either alone or in combination based on azadirachtin-A content in the inclusion complex ranging from 1% to 50% (wt/wt) for enhancing the shelf life and in plant defense mechanism against pathogen to have multiple effect.

2. Insecticidal formulation as claimed in claim 1 wherein the sunscreen agents are hydroquinone and anacardic acid.

3. Insecticidal formulation as claimed in claim 1 wherein salicylic acid, hydroquinone and anacardic acid are complexed in cyclodextrin with the ratio of salicylic acid/hydroquinone to cyclodextrin ranging from 1:0.5 to 1:20.

4. Insecticidal formulation as claimed in claim 1 wherein inclusion complex of neem seed kernel extract (NSKE) contains azadirachtin-A of 0.01% to 96% purity.

5. A [(2,6-di-O-methyl)-β-cyclodextrin] inclusion complex of neem seed kernel extract (NSKE) containing azadirachtin-A.

6. A process for the preparation of a water soluble inclusion complex of neem seed kernel extract (NSKE) containing azadirachtin-A in cyclodextrin comprises the following steps:

(a) adding neem seed kernel extract containing 0.01% to 96% of azadirachtin-A by wt. to cyclodextrin, the molar ratio of azadirachtin-A to the cyclodextrin ranging from 1:0.5 to 1:20;

(b) stirring the above mixture;

(c) filtering the above mixture to obtain a water soluble inclusion complex of neem seed kernel extract; and (d) if desired, freeze/spray drying the said water soluble complex of neem seed kernel extract to get a free flowing pale cream powder.

7. A process as claimed in claim 6 wherein said cyclodextrin is one of the natural cyclodextrins or their synthetic derivatives or a combination thereof in the ratio of 1:10 to 10:1.

8. A process as claimed in claim 7 wherein said natural cyclodextrins are α cyclodextrins or β cyclodextrins or γ cyclodextrins.

9. A process as claimed in claim 7 wherein the synthetic derivatives are methyl, propyl, isopropyl, hydroxymethyl, hydroxyethyl, hydroxypropyl and sulphoalkyl derivatives.

10. A process as claimed in claim 7 wherein said synthetic derivative is a β-methyl cyclodextrin.

* * * * *